US010437625B2

(12) United States Patent
Kaufman et al.

(10) Patent No.: US 10,437,625 B2
(45) Date of Patent: Oct. 8, 2019

(54) EVALUATING CONFIGURATION REQUESTS IN A VIRTUAL MACHINE

(71) Applicant: Microsoft Technology Licensing, LLC, Redmond, WA (US)

(72) Inventors: Peter J. Kaufman, Sammamish, WA (US); Sean Anderson Bowles, Seattle, WA (US); Shayak Lahiri, Redmond, WA (US); Tarun Kumar Jain, Bothell, WA (US); Prakash Ajay Kumar Suri, Sammamish, WA (US); Yuhang Zhu, Bellevue, WA (US); Adrian Francisco Teran Guajardo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 15/625,357

(22) Filed: Jun. 16, 2017

(65) Prior Publication Data

US 2018/0365043 A1 Dec. 20, 2018

(51) Int. Cl.
G06F 1/24 (2006.01)
G06F 9/00 (2006.01)
(Continued)

(52) U.S. Cl.
CPC ........ *G06F 9/45558* (2013.01); *G06F 9/4411* (2013.01); *G06F 9/44505* (2013.01);
(Continued)

(58) Field of Classification Search
None
See application file for complete search history.

(56) References Cited

U.S. PATENT DOCUMENTS 7,840,514 B2 11/2010 Keith
8,010,842 B2 8/2011 Krivopaltsev et al.
(Continued)

FOREIGN PATENT DOCUMENTS

EP 1615130 A2 1/2006
EP 2391089 A1 11/2011
(Continued)

OTHER PUBLICATIONS

Huang, et al., "An Effective Approach for Remote Attestation in Trusted Computing", In Proceedings of International Symposium on Web Information Systems and Applications, May 22, 2009, 4 Pages.
(Continued)

*Primary Examiner* — Nitin C Patel
(74) *Attorney, Agent, or Firm* — Medley, Behrens & Lewis, LLC

(57) ABSTRACT

Various technologies described herein pertain to evaluating configuration compliance of a computing device. The computing device operates in a configuration compliance evaluation mode to test a set of configuration requests for a configuration source. Configuration changes to the computing device can be applied in a virtual machine run on the computing device when operating in the configuration compliance evaluation mode. Responsive to each configuration request being received and when the computing device is operating in the configuration compliance evaluation mode, the computing device can store the configuration request in a data store, apply the configuration request in the virtual machine to cause a configuration change in the virtual machine, and store data for verifying enforcement of the configuration change in the data store. The configuration changes to the computing device applied in the virtual machine can be removed when the computing device dis-
(Continued)

continues operating in the configuration compliance evaluation mode.

20 Claims, 10 Drawing Sheets

(51) Int. Cl.
    *G06F 9/455*     (2018.01)
    *G06F 9/4401*     (2018.01)
    *G06F 9/445*     (2018.01)
    *G06F 11/36*     (2006.01)

(52) U.S. Cl.
    CPC ...... *G06F 11/3672* (2013.01); *G06F 11/3696* (2013.01); *G06F 2009/45595* (2013.01)

(56) References Cited

U.S. PATENT DOCUMENTS

| | | | |
|---|---|---|---|
| 8,479,257 | B1 | 7/2013 | Lloyd et al. |
| 9,060,239 | B1 | 6/2015 | Sinha et al. |
| 9,071,518 | B2 | 6/2015 | Malik et al. |
| 9,083,752 | B2 | 7/2015 | Shetty |
| 9,271,142 | B1 | 2/2016 | Broth et al. |
| 2006/0155909 | A1 | 7/2006 | Wu |
| 2009/0049518 | A1 | 2/2009 | Roman et al. |
| 2010/0293546 | A1* | 11/2010 | Liu ........................ G06F 16/954 718/100 |
| 2011/0252240 | A1 | 10/2011 | Freedman et al. |
| 2013/0232248 | A1 | 9/2013 | Kraus et al. |
| 2014/0148140 | A1 | 5/2014 | Ahn et al. |
| 2014/0165060 | A1* | 6/2014 | Muller ................ G06F 9/5022 718/1 |
| 2015/0038130 | A1 | 2/2015 | Mao et al. |
| 2015/0295757 | A1 | 10/2015 | Debate et al. |
| 2015/0296368 | A1 | 10/2015 | Kaufman et al. |
| 2016/0048436 | A1 | 2/2016 | Yamazaki |
| 2016/0094386 | A1 | 3/2016 | Kaufman et al. |
| 2016/0099969 | A1 | 4/2016 | Angus et al. |
| 2016/0259941 | A1 | 9/2016 | Vasudevan et al. |
| 2017/0177734 | A1* | 6/2017 | Liu ........................ G06F 16/954 |

FOREIGN PATENT DOCUMENTS

| | | |
|---|---|---|
| WO | 2009056148 A2 | 5/2009 |
| WO | 2016087323 A1 | 6/2016 |

OTHER PUBLICATIONS

"International Search Report and Written Opinion Issued in PCT Application No. PCT/US18/033576", dated Sep. 13, 2018, 21 Pages.

"Managing a Multi-Vendor Service Environment", http://www.icore-ltd.com/images/file/PDFs/Service-Integration-and-Management-iCore-White-Paper-v2.pdf, Sep. 29, 2016, 1-9 pages.

\* cited by examiner

EVALUATING CONFIGURATION REQUESTS IN A VIRTUAL MACHINE

BACKGROUND

Computing devices oftentimes enroll in configuration sources. When a computing device is enrolled in a configuration source, the configuration source can administer the computing device. The configuration source can distribute configuration requests to the computing device. The configuration requests can include values for policies, values for preferences, configuration profiles, and resources that can be applied to the computing device as part of the enrollment in the configuration source. The configuration requests applied to the computing device by the configuration source, for instance, can control and protect data and configuration settings for the computing device.

Many times, computing devices are managed by more than one configuration source. Multiple values for the same configuration (e.g., multiple values for the same policy) from different configuration sources can invoke a corresponding merge algorithm to determine a resultant enforceable value of the configuration. Moreover, the enforced value of the configuration can change based on certain triggers (e.g., based on context-aware management of the computing device).

Conventionally, it is difficult to identify whether a computing device is in an intended configuration state subsequent to configuration requests being provided to the computing device. For instance, with traditional approaches, it may be difficult to identify if and when application of a configuration request completes on the computing device. Moreover, traditional approaches typically do not enable verifying that various subsystems of the computing device enforce policies and provisioning resources in an intended manner (e.g., enforcement can be impacted by conflicting values for the same configuration specified by differing configuration sources or impacted by context-based triggers).

SUMMARY

Described herein are various technologies that pertain to evaluating configuration compliance of a computing device. The computing device can operate in a configuration compliance evaluation mode (e.g., the computing device can be switched to operate in the configuration compliance evaluation mode to test a set of configuration requests for a configuration source). Configuration changes to the computing device can be applied in a virtual machine run on the computing device when operating in the configuration compliance evaluation mode. Moreover, a set of configuration requests for the computing device can be received when the computing device is operating in the configuration compliance evaluation mode. Responsive to each configuration request in the set being received and when the computing device is operating in the configuration compliance evaluation mode, the computing device can store the configuration request in a data store of the computing device. Moreover, the configuration request can be applied in the virtual machine to cause a configuration change in the virtual machine, and data for verifying enforcement of the configuration change can be stored in the data store of the computing device when the computing device is operating in the configuration compliance evaluation mode. The configuration changes to the computing device applied in the virtual machine can be removed when the computing device discontinues operating in the configuration compliance evaluation mode; thus, after testing of the set of configuration requests for the configuration source, the computing device can revert to a state that such computing device was in prior to receiving and applying the set of configuration requests.

Pursuant to various embodiments, an evaluation can be performed to determine whether an enforced configuration state of the computing device complies with an intended configuration state. The enforced configuration state, which can be evaluated, is based on the configuration changes to the computing device applied in the virtual machine. Thus, verification that the enforced configuration state of the computing device complies with the intended configuration state can be performed based on the enforced configuration state resulting from the configuration requests in the set being applied in the virtual machine. According to various examples, the verification can be performed by an attestation device physically coupled with the computing device, a user interacting with a user interface displayed on a display screen (e.g., of the computing device), or the like. For instance, the user interface can include instructions for verifying whether the enforced configuration state complies with the intended configuration state. Moreover, after performing the verification, the configuration changes applied in the virtual machine can be removed from the computing device (e.g., when the computing device discontinues operating in the configuration compliance evaluation mode).

According to various embodiments, the computing device may not previously be enrolled in a configuration source prior to operating in the configuration compliance evaluation mode and receiving the set of configuration requests. According to other embodiments, the computing device may be previously enrolled in at least one configuration source prior to operating in the configuration compliance evaluation mode and receiving the set of configuration requests.

According to other embodiments, it is contemplated that configuration compliance can be evaluated without the configuration changes being applied in the virtual machine run on the computing device. The set of configuration requests for the computing device can be received at the computing device. Responsive to each configuration request in the set being received, the computing device can store the configuration request in the data store of the computing device. Moreover, the configuration request can be applied on the computing device to cause a configuration change, and data for verifying enforcement of the configuration change can be stored in the data store of the computing device. Further, an evaluation can be performed to determine whether an enforced configuration state of the computing device complies with an intended configuration state.

In accordance with other embodiments, configuration compliance of the computing device can be analyzed after enrollment in a configuration source. A set of configuration requests for the computing device can be received, at the computing device, from the configuration source. The configuration requests can be applied on the computing device. Moreover, breadcrumbs can be generated as the configuration requests are applied on the computing device. A history of the configuration requests being applied on the computing device can further be reconstructed based on the breadcrumbs, the configuration requests, and a current enforced configuration state of the computing device. The reconstructed history can be employed to identify a source of misconfiguration of the computing device (e.g., determine a particular configuration request causing the misconfiguration, determine a particular merge of conflicting configuration requests causing the misconfiguration).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
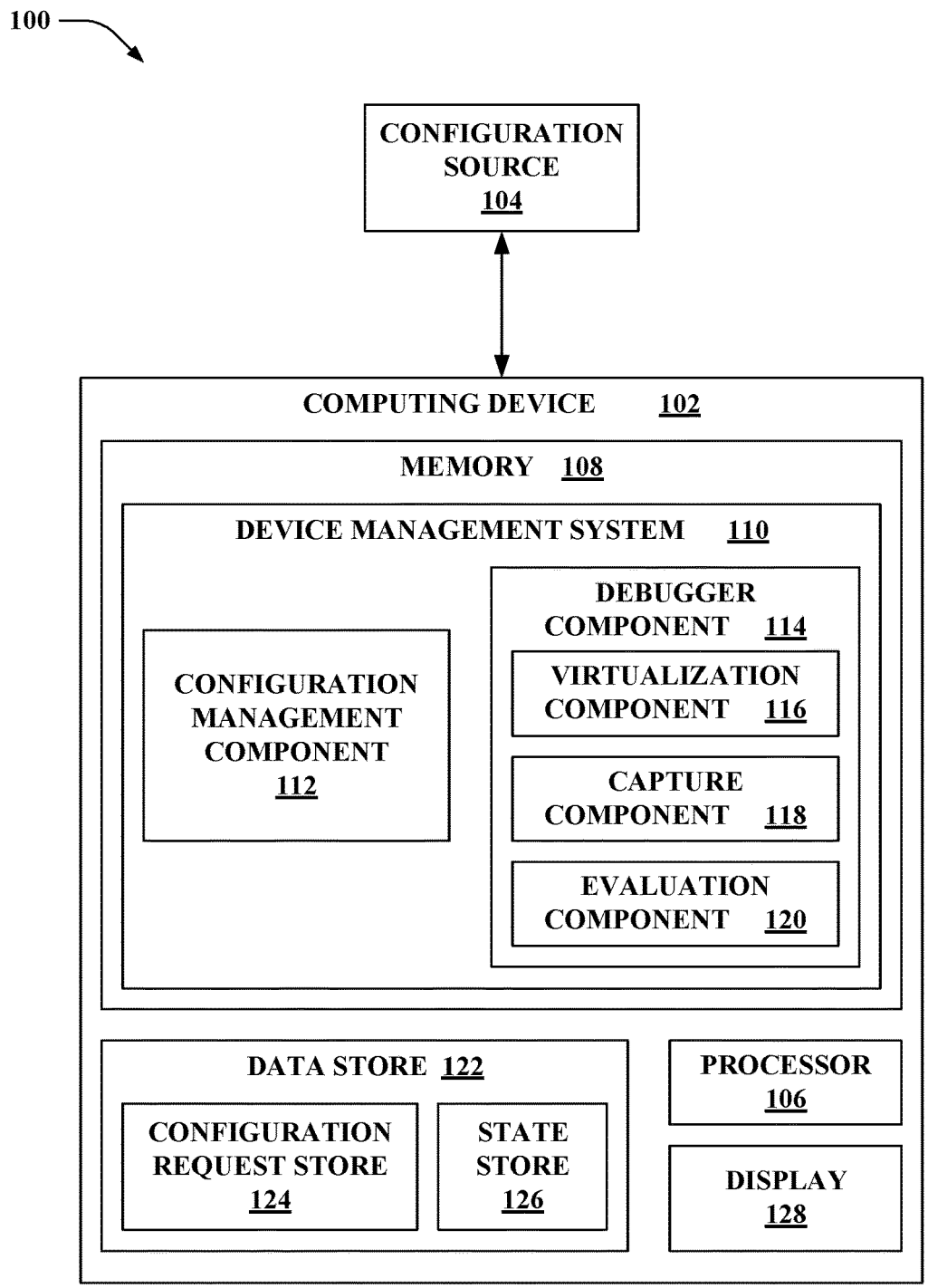
FIG. 1 illustrates a functional block diagram of an exemplary system that controls evaluating configuration compliance of a computing device.

Various technologies pertaining to evaluating configuration compliance of a computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that controls evaluating configuration compliance of a computing device 102. The system includes the computing device 102 and a configuration source 104. While the system 100 is shown as including one configuration source 104, it is to be appreciated that the system 100 can include more than one configuration source. The configuration source 104 can transmit configuration requests to the computing device 102 that control enabling and/or disabling features of subsystems on the computing device 102. The configuration requests can include values for policies, values for preferences, configuration profiles, and resources that can be applied to the computing device 102.

The computing device 102 includes at least one processor 106 and memory 108. The processor 106 is configured to execute instructions loaded into the memory 108 (e.g., one or more systems loaded into the memory 108 are executable by the processor 106, one or more components loaded into the memory 108 are executable by the processor 106). As described in greater detail herein, the memory 108 includes a device management system 110 that controls configuring the computing device 102 based on configuration requests for the configuration source 104 (as well as any disparate configuration sources, if any). Moreover, the device management system 110 can enable verification of whether features of the subsystems of the computing device 102 are configured (based on the configuration requests) in an intended manner, such that the computing device 102 is in an intended configuration state.

Various types of computing devices are intended to fall within the scope of the hereto appended claims. The computing device 102 can be a mobile computing device. Examples of a mobile computing device include a laptop computing device, a mobile telephone (e.g., a smartphone), a tablet computing device, a wearable computing device, a handheld computing device, a portable gaming device, a personal digital assistant, a portable all-in-one computing device, or the like. Pursuant to other examples, the computing device 102 can be a desktop computing device, a gaming console, an embedded computing device (e.g., connectable via the Internet of Things (IoT)), and so forth.

Various types of configuration sources are intended to fall within the scope of the hereto appended claims. Moreover, although not shown in FIG. 1, the computing device 102 can concurrently enroll in more than one type of configuration source. The configuration source 104 can be or include a remote server or a remote agent external to the computing device 102. For instance, the configuration source 104 can be or include a type of enterprise device management server. An example of an enterprise device management server is a mobile device management (MDM) server. An MDM server can control and protect data and configuration settings on computing devices using over-the-air distribution of applications, data, and policy configuration requests. Moreover, other types of enterprise device management servers can provide remote control, patch management, software distribution, operating system deployment, network access protection, and inventory management for computing devices. Yet, the claimed subject matter is not limited to the foregoing examples, as other types of configuration sources are intended to fall within the scope of the hereto appended claims (e.g. the configuration source 104 can be or include a messaging server, a document server, etc.). Moreover, although not depicted, it is contemplated that the computing device 102 can further include an internal configuration source (e.g., an application executed by the processor 106 of the computing device 102 can send configuration request(s) to the device management system 110). Thus, the examples set forth herein can be extended to a scenario where the computing device 102 includes an internal configuration source in addition to or instead of the configuration source 104.

The configuration source 104 can cause features of subsystems of the computing device 102 to be configured on the computing device 102. The features configured by the configuration source 104 can include policies, preferences, configuration profiles, resources (e.g., applications), and the like. To cause features to be configured on the computing device 102, the configuration source 104 can transmit configuration requests to the computing device 102. The configuration requests can include configuration data for the features to be enabled on the computing device 102. Configuration data for a feature, for example, can include at least one of a policy value, a certificate, a profile, or a setting for the feature. The configuration request can be a Synchronized Markup Language (SyncML) message, an Extensible Markup Language (XML) message, or the like; yet, other formats are intended to fall with the scope of the hereto appended claims.

The device management system 110 can enable a set of configuration requests from the configuration source 104 to be tested on the computing device 102. More particularly, the device management system 110 can include a configuration management component 112 and a debugger component 114. The configuration management component 112 can cause features of subsystems of the computing device 102 to be set based on received configurations requests, where the configuration requests include configuration data for the features. Thus, the configuration management component 112 can cause the configuration requests to be applied on the computing device 102. Moreover, the debugger component 114 enables evaluating configuration compliance of the computing device 102. The debugger component 114 can control an environment in which the configuration requests are applied on the computing device 102 as well as enable analyzing an enforced configuration state of the computing device 102, thereby allowing for testing of the set of configuration requests (e.g., the set of configuration requests received from the configuration source 104 in the example of FIG. 1). The debugger component 114 allows a management technology (e.g., provided by the configuration source 104) to be deployed, such that a resultant set of configuration requests leads to securing an environment in which enrolled computing devices operate, is enforced correctly on the enrolled computing devices, and configures the computing devices with desired resources.

According to the example shown in FIG. 1, the computing device 102 is not currently configured by any configuration source (e.g., the computing device 102 is not currently enrolled in any configuration source). Following this example, a set of configuration requests that are part of an enrollment in the configuration source 104 can be tested on the computing device 102. Thus, the computing device 102 can communicate with the configuration source 104, such that the set of configuration requests are received from the configuration source 104. Accordingly, the configuration management component 112 can apply the configuration requests on the computing device 102, and the debugger component 114 can control the environment in which the configuration requests are applied and enable analyzing the configurations on the computing device 102. The debugger component 114 can cause the configuration management component 112 to apply the configuration requests in a test environment; thus, the set of configuration requests can be evaluated on the computing device 102 in the test environment, and the set of configuration requests can be removed from the computing device 102 after testing.

By way of illustration, during testing of the set of configuration requests applied on the computing device 102, an administrator can view an enforced configuration state of the computing device 102. Following this illustration, the administrator can evaluate whether the enforced configuration state of the computing device 102 complies with an intended configuration state. For instance, if the administrator identifies during testing that the set of configuration requests are suitable (e.g., the set of configuration requests causes the computing device 102 to be in an enforced configuration state that complies with an intended configuration state), then the set of configuration requests can be delivered to a plurality of computing devices, each of which can be substantially similar to the computing device 102, for deployment on the plurality of computing devices. For example, an administrator of an enterprise can test the set of configuration requests on one computing device (e.g., the computing device 102); upon verifying the set of configuration requests, the administrator can cause the set of configuration requests to be deployed on a plurality of similarly situated computing devices (e.g., deployed on similarly situated computing devices in an environment of the enterprise, which can but need not include the computing device 102).

The debugger component 114 can include a virtualization component 116, a capture component 118, and an evaluation component 120. Moreover, the computing device 102 can include a data store 122. The data store 122 can further include a configuration request store 124 and a state store 126.

The debugger component 114 can operate the computing device 102 in a configuration compliance evaluation mode. When operating in the configuration compliance evaluation mode, the virtualization component 116 can run a virtual machine on the computing device 102. Further, when operating in configuration compliance evaluation mode, the configuration management component 112 can apply configuration requests in the virtual machine run on the computing device 102 by the virtualization component 116 to cause configuration changes in the virtual machine run on the computing device 102. When the virtualization component 116 discontinues operating the computing device 102 in the configuration compliance evaluation mode, the configuration changes to the computing device 102 applied in the virtual machine can be removed from the computing device 102. Accordingly, the configuration requests can be applied in a virtualized host in the configuration compliance evaluation mode; such application of the configuration requests does not affect the computing device 102 when the configuration compliance evaluation mode is discontinued. Thus, the set of configuration requests can be applied as part of a temporary enrollment in the configuration source 104.

As noted above, a set of configuration requests for the computing device 102 can be received at the computing device 102 when the computing device 102 is operating in the configuration compliance evaluation mode. Responsive to each configuration request in the set being received and when the computing device 102 is operating in the configuration compliance evaluation mode, the capture component 118 can store the configuration request in the configuration request store 124 in the data store 122 of the computing device 102. Moreover, the configuration request can be applied by the configuration management component 112 in the virtual machine run by the virtualization component 116 to cause a configuration change in the virtual machine. The capture component 122 can further store data for verifying enforcement of the configuration change in the state store 126 of the data store 122 of the computing device 102. The data for verifying enforcement of the configuration change stored in the state store 126 can include data indicative of the configuration change and data for verifying whether the configuration change is actually enforced on the computing device 102. Again, as set forth above, when the computing device 102 discontinues operating in the configuration compliance evaluation mode, the configuration changes to the computing device 102 applied in the virtual machine can be removed from the computing device 102. It is also contemplated that the configuration requests stored in the configuration request store 124 and/or the data for verifying enforcement of the configuration changes in the state store 126 can additionally be removed when the computing device 102 discontinues operating in the configuration compliance evaluation mode; however, the claimed subject matter is not so limited.

The evaluation component 120 enables analyzing the set of configuration requests and results of application of such configuration requests in the virtual machine. The evaluation component 120 can enable verifying whether an enforced configuration state of the computing device 102 complies with an intended configuration state, where the enforced configuration state is based on the configuration changes to the computing device 102 applied in the virtual machine. The evaluation component 120 can perform one or more of the operations described herein responsive to user input received at the computing device 102, input received from a computing device communicatively coupled with the computing device 102 (e.g., an attestation device as described herein), input received from the configuration source 104 (or a differing configuration source), or the like.

For example, the evaluation component 120 can cause a user interface to be displayed on a display 128 of the computing device 102. The user interface displayed by the evaluation component 120 can include instructions for verifying whether an enforced configuration state of the computing device 102 complies with an intended configuration state. The instructions displayed by the evaluation component 120 on the display 128 as part of the user interface, for instance, can be part of a wizard. The instructions displayed by the evaluation component 120 can prompt a user to perform actions intended to check whether the enforced configuration state of the computing device 102 in the virtual machine complies with the intended configuration state. Thus, the user can follow the instructions to identify whether the intended configuration state is being enforced on the virtual machine. For instance, a configuration request can specify how to verify that a subsystem intended to be configured based on such configuration request actually enforces a configuration (e.g., the configuration request can declare a mechanism that can be used to verify enforcement of a value for a feature); accordingly, the evaluation component 120 can cause such information to be displayed as part of the user interface for each of the configuration requests applied in the virtual machine. The configuration request can also specify an intent of the configuration request (e.g., which can be verified on the computing device 102 after application of the configuration request in the virtual machine). It is also contemplated that a contextually-switching policy can declare a mechanism that can be used to verify application of a new configuration and enforcement of such configuration. Responsive to the instructions included in the user interface being performed, the evaluation component 120 can evaluate and track fulfillment of the configuration intents for the set of configuration requests on the computing device 102.

Pursuant to another example, the evaluation component 120 can display the data for verifying enforcement of the configuration changes over a time period during which the set of configuration requests are applied (e.g., on the display 128, on a display of a device communicatively coupled with the computing device 102). The data for verifying enforcement of the configuration changes retained in the state store 126 over the time period can be retrieved and displayed by the evaluation component 120. The configuration requests retaining in the configuration request store 124 can also be retrieved and displayed by the evaluation component 120. Temporal changes in each stage of configuration (e.g., for each payload of the set of configuration requests received by the computing device 102) during the time period in which the set of configuration requests are applied (in the virtual machine) can be observed via utilizing the evaluation component 120. In accordance with an illustration, the evaluation component 120 can enable an administrator to view configuration merges, resultant values, and actual enforcement of those values throughout the configuration time period and after the set of configuration requests have been removed. According to an example, each component (e.g., each subsystem interaction component) that enforces policies on the computing device 102 can be viewed utilizing the evaluation component 120 to analyze enforcement in effect. Moreover, when the computing device 102 finishes synchronizing with the configuration source 104, the administrator can view the enforced configuration state of the computing device 102. Accordingly, the administrator can be allowed to evaluate whether the result of the set of configuration requests is causing the computing device 102 to reach the intended configuration state. For instance, the administrator can determine whether the computing device 102 reaches a desired level of security and has access to resources needed for productivity. Moreover, after the configuration changes applied in the virtual machine are removed, an impact of such configuration changes does not linger on the computing device 102.

According to another example, the evaluation component 120 can enable traversing backwards and forwards through each stage of configuration during the time period in which the set of configuration requests are applied. The evaluation component 120 can use the data for verifying enforcement of the configuration changes retained in the state store 126 and/or the configuration requests retained in the configuration request store 124 to undo and reapply each stage of configuration. According to an illustration, the evaluation component 120 can undo at least one of the configuration changes to the computing device 102 applied in the virtual machine based on at least one of the configuration requests in the set when the computing device 102 is operating in the configuration compliance evaluation mode. The evaluation component 120 can further reapply the at least one of the configuration changes (or a subset thereof) to the computing device 102 in the virtual machine, for instance.

Pursuant to a further example, subsequent to undoing the at least one of the configuration changes, an updated configuration request can be received at the computing device 102 when the computing device 102 is operating in the configuration compliance evaluation mode (e.g., the updated configuration request can replace a configuration request identified as not causing the enforced configuration state to comply with the intended configuration state). Following this example, responsive to the updated configuration request being received and when the computing device 102 is operating in the configuration compliance evaluation mode, the capture component 118 can store the updated configuration request in the configuration request store 124 of the data store 122 of the computing device 102. Moreover, the updated configuration request can be applied by the configuration management component 112 in the virtual machine to cause an updated configuration change in the virtual machine and data for verifying enforcement of the updated configuration change can be stored by the capture component 118 in the state store 126 of the data store 122 of the computing device 102 responsive to the updated configuration request being received and when the computing device 102 is operating in the configuration compliance evaluation mode. Further, it is to be appreciated that more than one updated configuration request can similarly be received and handled by the computing device 102. Additionally, it is contemplated that updated configuration request(s) can be received and handled by the computing device 102 without previously undoing one or more configuration changes (e.g., the updated configuration request(s) can be added to the set of configuration requests). Moreover, an updated, enforced configuration state can be analyzed utilizing the evaluation component 120 to verify whether it complies with the intended configuration state, where the updated, enforced configuration state is based at least in part on the updated configuration change to the computing device 102.

According to an illustration, the computing device 102 may not currently be configured by any configuration source. The debugger component 118 can switch the computing device 102 to the configuration compliance evaluation mode, and the enrollment process can begin between the computing device 102 and the configuration source 104. Because the computing device 102 is in the configuration compliance evaluation mode, application of each interaction with the configuration source 104 can be virtualized by the virtualization component 116. The capture component 118 can capture each interaction with the configuration source 104 (e.g., the configuration requests in the set received from the configuration source 104 can be stored in the configuration request store 124 of the data store 122 of the computing device 102). The capture component 118 can also store data for verifying enforcement of configuration changes resulting from the configuration requests being applied by the configuration management component 112 in the virtual machine run by the virtualization component 116; the data for verifying enforcement of the configuration changes can be stored by the capture component 118 as the set of configuration requests are received and applied (e.g., as a set of policies and resources are received with each payload from the configuration source 104).

Further, whether the enforced configuration state of the computing device 102 complies with an intended configuration state can be verified. The enforced configuration state can be based on the configuration changes to the computing device 102 applied in the virtual machine. For instance, after verifying that the configuration intent is being enforced correctly in the virtual machine, the set of configuration requests can be marked as successful. When the set of configuration requests is marked as successful, an administrator can cause the configuration source 104 to send the set of configuration requests to a plurality of computing devices that are currently not configured in an environment of an enterprise. Further, the configuration compliance evaluation mode on the computing device 102 can be discontinued and the virtualized settings in the virtual machine can be removed, thereby enabling the computing device 102 to return to its original state.

According to an example, the device management system 110 (or a portion thereof) can be part of an operating system of the computing device 102 (e.g., the memory 108 can include the operating system and the operating system can include the device management system 110). Pursuant to another example, the device management system 110 (or a portion thereof) can be a third-party system that integrates with the operating system of the computing device 102. For instance, it is contemplated that the debugger component 114 can be part of an operating system of the computing device 102 or part of a separate set of tools.

Moreover, while many of the examples set forth herein describe use of a virtual machine run on the computing device 102, it is contemplated that alternatively configuration compliance can be evaluated without the configuration changes being applied in the virtual machine run on the computing device 102. Thus, the set of configuration requests for the computing device 102 can be received at the computing device 102. Responsive to each configuration request in the set being received, the computing device 102 (e.g., the capture component 118) can store the configuration request in the data store 122 of the computing device 102. Moreover, the configuration request can be applied on the computing device 102 to cause a configuration change, and data for verifying enforcement of the configuration change can be stored in the data store 122 of the computing device 102. Further, an evaluation can be performed by the evaluation component 120 to determine whether an enforced configuration state of the computing device 102 complies with an intended configuration state utilizing the techniques set forth herein. For instance, the computing device 102 can traverse through configuration verification steps, a protocol, a user interface or the like to verify whether the enforced configuration state of the computing device 102 complies with the intended configuration state. By way of illustration, if the enforced configuration state does not comply with the intended configuration state, then logs and other diagnostic information can be retrieved from the data store 122 and transmitted from the computing device 102 (e.g., sent to a computing device of an administrator).

Figure 2:
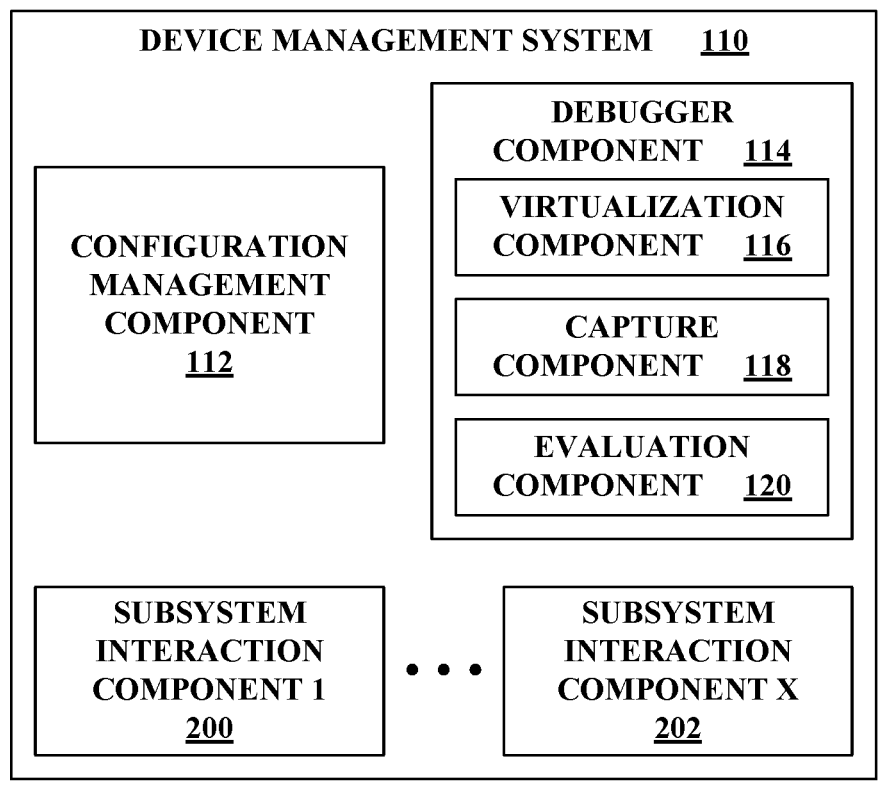
FIG. 2 illustrates a functional block diagram of a device management system according to various embodiments.

Now referring to FIG. 2, illustrated is the device management system 110 according to various embodiments. Again, the device management system 110 can include the configuration management component 112 and the debugger component 114, which can further include the virtualization component 116, the capture component 118, and the evaluation component 120. The device management system 110 can also include a plurality of subsystem interaction components, namely, a subsystem interaction component 1 200, . . . , and a subsystem interaction component X 202, where X can be substantially any integer greater than one (collectively referred to herein as subsystem interaction components 200-202). While the device management system 110 is described herein as including more than one subsystem interaction component 200-202, it is to be appreciated that the device management system 110 can alternatively include one subsystem interaction component.

The configuration management component 112 can manage operations on the subsystem interaction components 200-202. By way of illustration, the configuration management component 112 can cause the subsystem interaction component 1 200 to set a feature of a corresponding subsystem responsive to receiving a configuration request that includes configuration data for such feature. Following this illustration, the configuration management component 112 can identify that the feature is part of the subsystem handled by the subsystem interaction component 1 200 and can send a command to set the feature to the subsystem interaction component 1 200.

The subsystem interaction components 200-202 are components of a computing device (e.g., the computing device 102) that handle configuration requests for specific subsystems. For instance, each subsystem can have a respective subsystem interaction component 200-202. By way of illustration, the subsystem interaction component 1 200 (e.g., a first plug-in) can handle a first subsystem and the subsystem interaction component X 202 (e.g., a second plug-in) can handle a second subsystem. Additionally or alternatively, a generic subsystem interaction component (e.g., one of the subsystem interaction components 200-202) can handle configuring a group of subsystems. Thus, the configuration management component 112 can identify that a configuration request comprises configuration data for a particular feature that is part of a given subsystem; accordingly, the configuration management component 112 can send a command to the subsystem interaction component corresponding to set the particular feature of the given subsystem.

Each of the subsystem interaction components 200-202 can enforce configurations on the computing device (e.g., the computing device 102). The subsystem interaction components 200-202 can each declare how to verify the enforcement of the configurations by the subsystem interaction components 200-202. Accordingly, attestation from the subsystem interaction components 200-202 available from different subsystems can be utilized to verify that the subsystem interaction components 200-202 are configured in an intended manner. For instance, as noted above, the evaluation component 120 can cause instructions for verifying an enforced configuration state (e.g., enforced by the subsystem interaction components 200-202) to be displayed. The instructions can be displayed as part of a user interface displayed on the display 128 of the computing device 102 or on a differing display of a differing computing device communicatively coupled with the computing device 102. Pursuant to another example, a computing device (e.g., the attestation device described herein) can employ the attestation from the subsystem interaction components 200-202 to verify the enforcement of the configurations.

Figure 3:
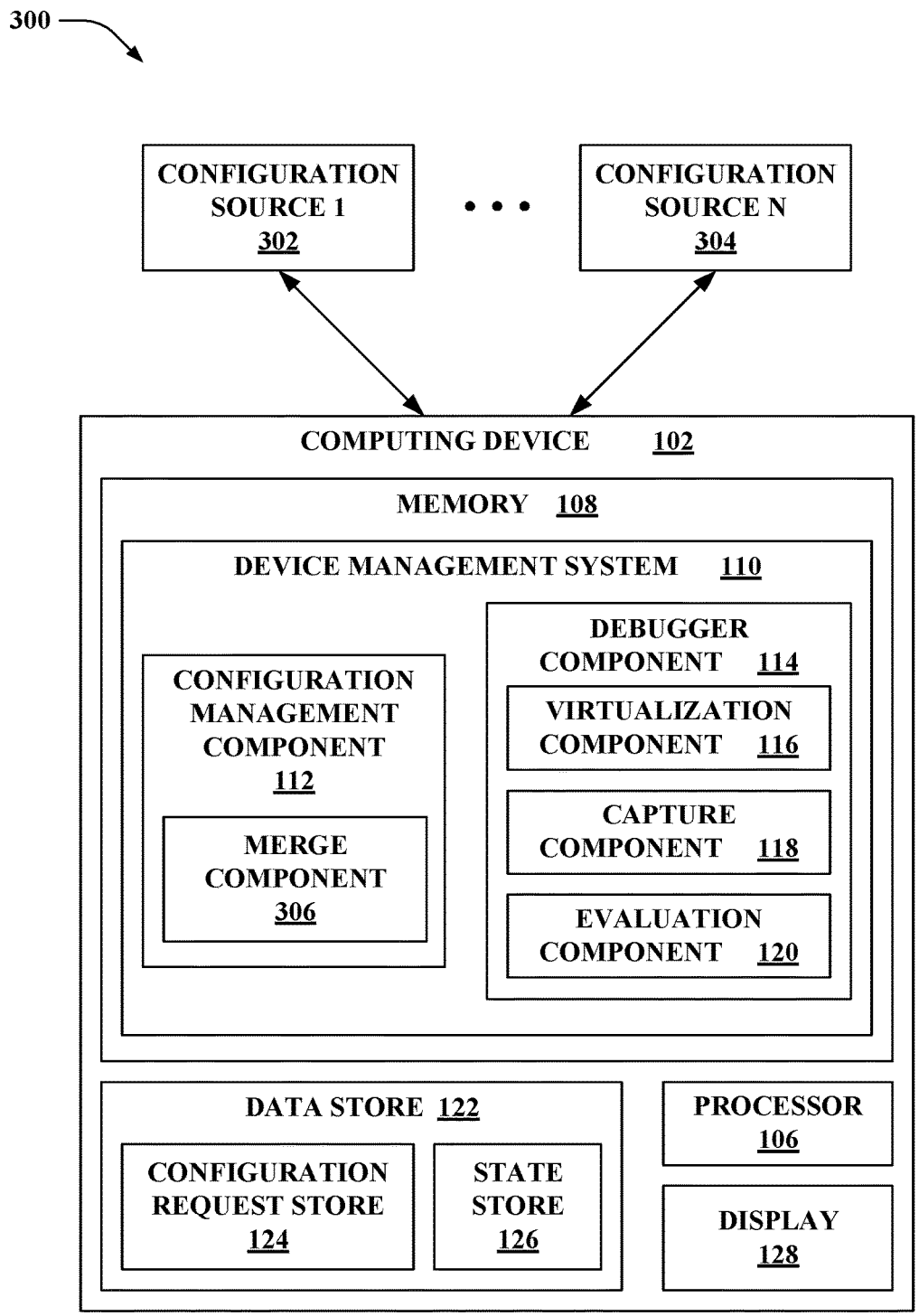
FIG. 3 illustrates a functional block diagram of an exemplary system for evaluating configuration compliance of the computing device.

Now turning to FIG. 3, illustrated is another system 300 for evaluating configuration compliance of the computing device 102. The system 300 includes the computing device 102 as well as a plurality of configuration sources, namely, a configuration source 1 302, . . . , and a configuration source N 304, where N can be substantially any integer greater than one (collectively referred to herein as configuration sources 302-304). The configuration sources 302-304 can include substantially any type(s) of configuration sources (e.g., the configuration source 1 302 and the configuration source N 304 can be the same type of configuration source, the configuration source 1 302 and the configuration source N 304 can be different types of configuration sources).

In the example set forth in FIG. 3, the computing device 102 can be previously enrolled in at least one configuration source (e.g., one of the configuration sources 302-304) prior to operating in a configuration compliance evaluation mode and receiving a set of configuration requests from a configuration source (e.g., one of the configuration sources 302-304). For example, the computing device 102 may be enrolled in the configuration source N 304 (e.g., the computing device 102 is currently configured by a management authority). Further, the debugger component 118 can enable testing the set of configuration requests from the configuration source 1 302 (where the set of configuration requests are part of an enrollment in the configuration source 1 302) on the computing device 102.

Continuing reference is made to the example where the computing device 102 is enrolled in the configuration source N 304 and the set of configuration requests for the configuration source 1 302 are tested on the computing device 102. The debugger component 114 can operate the computing device 102 in the configuration compliance evaluation mode (e.g., the computing device 102 can be switched to the configuration compliance evaluation mode after being enrolled in the configuration source N 304 but before receiving the set of configuration requests from the configuration source 1 302). Similar to above, when operating in the configuration compliance evaluation mode, the virtualization component 116 can run a virtual machine on the computing device 102. When operating in the configuration compliance evaluation mode, the set of configuration requests for the configuration source 1 302 can be received from the configuration source 1 302. The set of configuration requests for the configuration source 1 302 can be part of an enrollment in the configuration source 1 302 (the enrollment in the configuration source 1 302 differs from an enrollment in the configuration source N 304). Moreover, the configuration management component 112 can apply the configuration requests in the virtual machine run on the computing device 102 by the virtualization component 116 to cause configuration changes in the virtual machine run on the computing device 102.

The configuration management component 112 can further include a merge component 306, which can merge configuration requests from the configuration sources 302-304. For instance, a configuration request in the set of configuration requests for the configuration source 1 302 can conflict with a conflicting configuration request for the configuration source N 304 in which the computing device 102 is previously enrolled. Accordingly, when the configuration request in the set of configuration requests for the configuration source 1 302 is applied in the virtual machine, the merge component 306 can merge such configuration request with the conflicting configuration request from the configuration source N 304 in which the computing device 102 is previously enrolled. The merge component 306 can employ substantially any merge algorithm to determine a resultant enforceable value of a configuration when there is a conflict between configuration requests for differing configuration sources 302-304.

Again, after switching the computing device 102 to the configuration compliance evaluation mode, the configuration source 1 302 can be added to a group of configuration sources managing the computing device 102. Because the computing device 102 is in the configuration compliance evaluation mode, the capture component 118 can store each interaction with the new configuration source, namely, the configuration source 1 302. For instance, the capture component 118 can store the configuration requests received from the configuration source 1 302 in the configuration request store 124 of the data store 122. The configuration requests can be applied by the configuration management component 112 in the virtual machine run by the virtualization component 116 to cause configuration changes in the virtual machine (e.g., with configuration request(s) being merged by the merge component 306 if needed). Moreover, the capture component 118 can store data for verifying enforcement of configuration changes in the state store 126 of the data store 122 of the computing device 102. Similar to above, the evaluation component 120 can enable analyzing the set of configuration requests and results of application of such configuration requests in the virtual machine. For instance, the evaluation component 120 can expose changes in an enforced configuration state of the virtual machine of the computing device 102 over a time period as the set of configuration requests are received and applied (e.g., as a set of policies and resources are received with each payload from the configuration source 1 302).

According to an example, a configuration request can specify how to verify that a subsystem desirably configured based on such configuration request actually enforces a configuration. Additionally or alternatively, subsystem interaction component(s) (e.g., one of more of the subsystem interaction components 200-202) can verify whether the enforced configuration state of the computing device 102 set by the group of configuration sources (e.g., the configuration source 1 302 and the configuration source N 304) meets intended configuration states for each of the configuration sources. Pursuant to an illustration, an administrator can observe that a subsystem interaction component is reporting that a resultant value of a feature configured based on a configuration request from the configuration source 1 302 differs from an intended value. Following this illustration, the last n payloads from the configuration source 1 302 can be undone by the evaluation component 120 (e.g., responsive to user input from the administrator). Moreover, the invalid configuration request(s) can be reported (e.g., to the configuration source 1 302), and updated configuration request(s) can be received and applied in the virtual machine. Again, the evaluation component 120 can enable verifying whether the updated, enforced configuration state (with merging of the configuration requests from the group of configuration sources) complies with the intended configuration state. After verifying that the configurations are being enforced in an intended manner by the subsystems, the administrator can sign off on the set of configuration requests from the configuration source 1 302 being suitable to be pushed down to computing devices in an environment of an enterprise, where such computing devices are currently configured by the configuration source N 304 (with the set of configuration requests causing the computing devices to additionally be enrolled in the configuration source 1 302).

Figure 4:
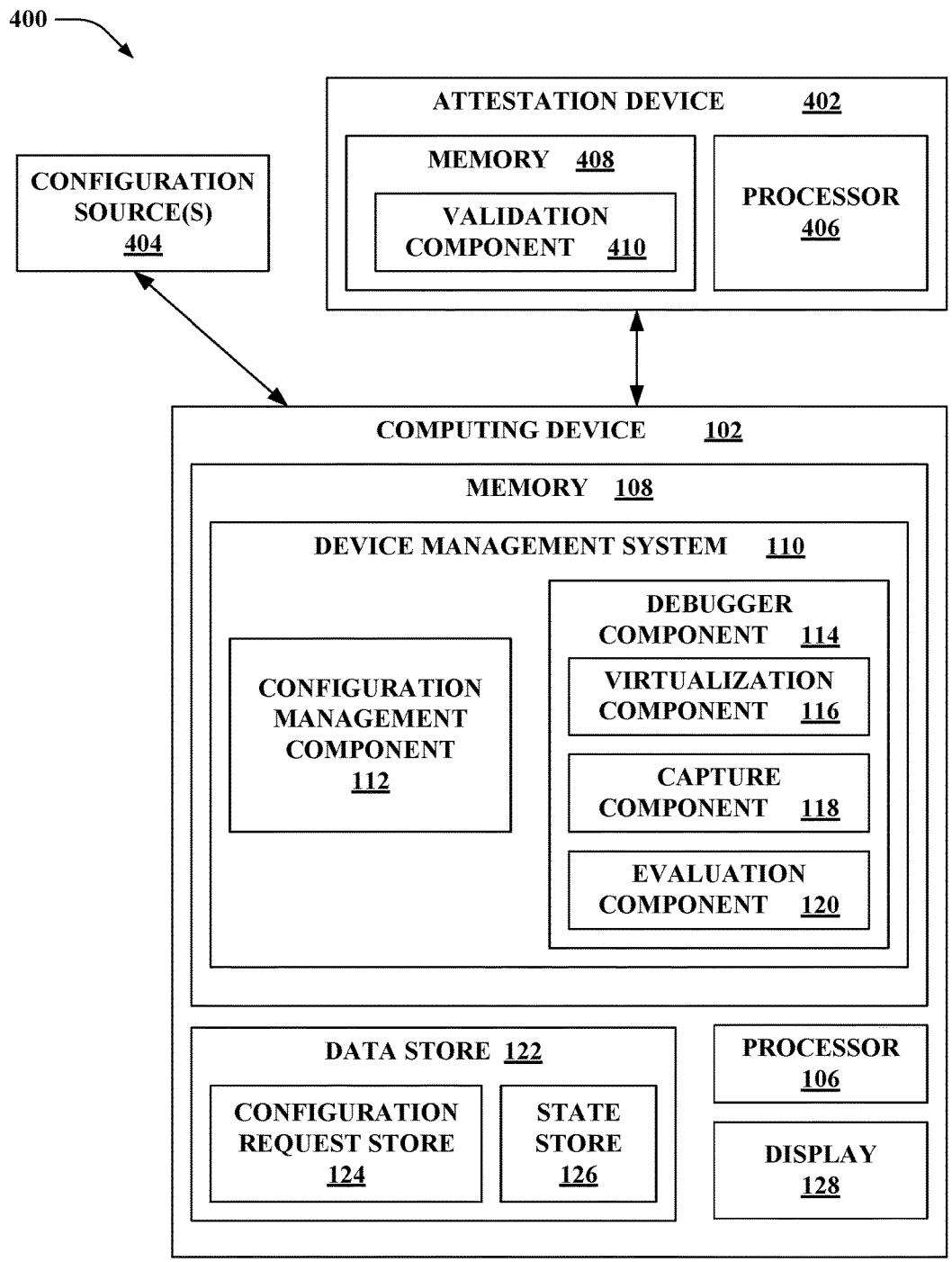
FIG. 4 illustrates a functional block diagram of an exemplary system that employs an attestation device to verify whether an enforced configuration state of the computing device complies with an intended configuration state.

Now turning to FIG. 4, illustrated is a system 400 that employs an attestation device 402 to verify whether an enforced configuration state of the computing device 102 complies with an intended configuration state. The system 400 includes the computing device 102, the attestation device 402, as well as one or more configuration sources 404 (e.g., the configuration source 104, one of more of the configuration sources 302-304). The attestation device 402 can physically couple with the computing device 102; thus, the attestation device 402 can be a pluggable hardware module that validates whether an enforced configuration state of the computing device 102 complies with an intended configuration state.

The attestation device 402 can include at least one processor 406 and memory 408. The processor 406 is configured to execute instructions loaded into the memory 408. The memory 408 can include a validation component 410 that performs verification of whether an enforced configuration state of the computing device 102 complies with an intended configuration state. For instance, the validation component 410 can send requests to and receive responses from the evaluation component 120 of the computing device 102. Additionally or alternatively, at least a subset of the operations described herein as being performed by the evaluation component 120 can alternatively be performed by the validation component 410.

The validation component 410 can evaluate and track fulfillment of configuration intents for a set of configuration requests on the computing device 102. By way of example, the validation component 410 can perform instructions for verifying whether the enforced configuration state of the computing device 102 complies with the intended configuration state (e.g., the instructions can be provided by the evaluation component 120). According to another example, the validation component 410 can generate a report specifying a percent compliance of the enforced configuration state of the computing device 102 relative to the intended configuration state.

Again, the debugger component 114 can operate the computing device 102 in the configuration compliance evaluation mode; thus, the virtualization component 116 can run a virtual machine on the computing device 102. In the example set forth in FIG. 4, a set of configuration requests can be received by the computing device 102 from one of the configuration source(s) 404 while the computing device 102 is operating in the configuration compliance evaluation mode (e.g., the computing device 102 may or may not be previously enrolled in a differing one of the configuration source(s) 404). The set of configuration requests can be part of an enrollment in such configuration source. Responsive to each of the configuration requests in the set being received and while the computing device 102 is operating in the configuration compliance evaluation mode, the capture component 122 can store the configuration requests in the data store 128 as part of the configuration request store 124. Further, the configuration management component 112 can apply the configuration requests in the virtual machine run on the computing device 102 by the virtualization component 116 to cause configuration changes in the virtual machine. The capture component 122 can further store data for verifying enforcement of the configuration changes in the state store 126 in the data store 122 of the computing device 102. Further, the enforced configuration state of the computing device 102 can be verified to determine whether it complies with the intended configuration state, where the enforced configuration state can be based on the configuration changes to the computing device 102 in the virtual machine. In the example set forth in FIG. 4, the validation component 410 of the attestation device 402 can verify whether the enforced configuration state of the computing device 102 complies with the intended configuration state.

Figure 5:
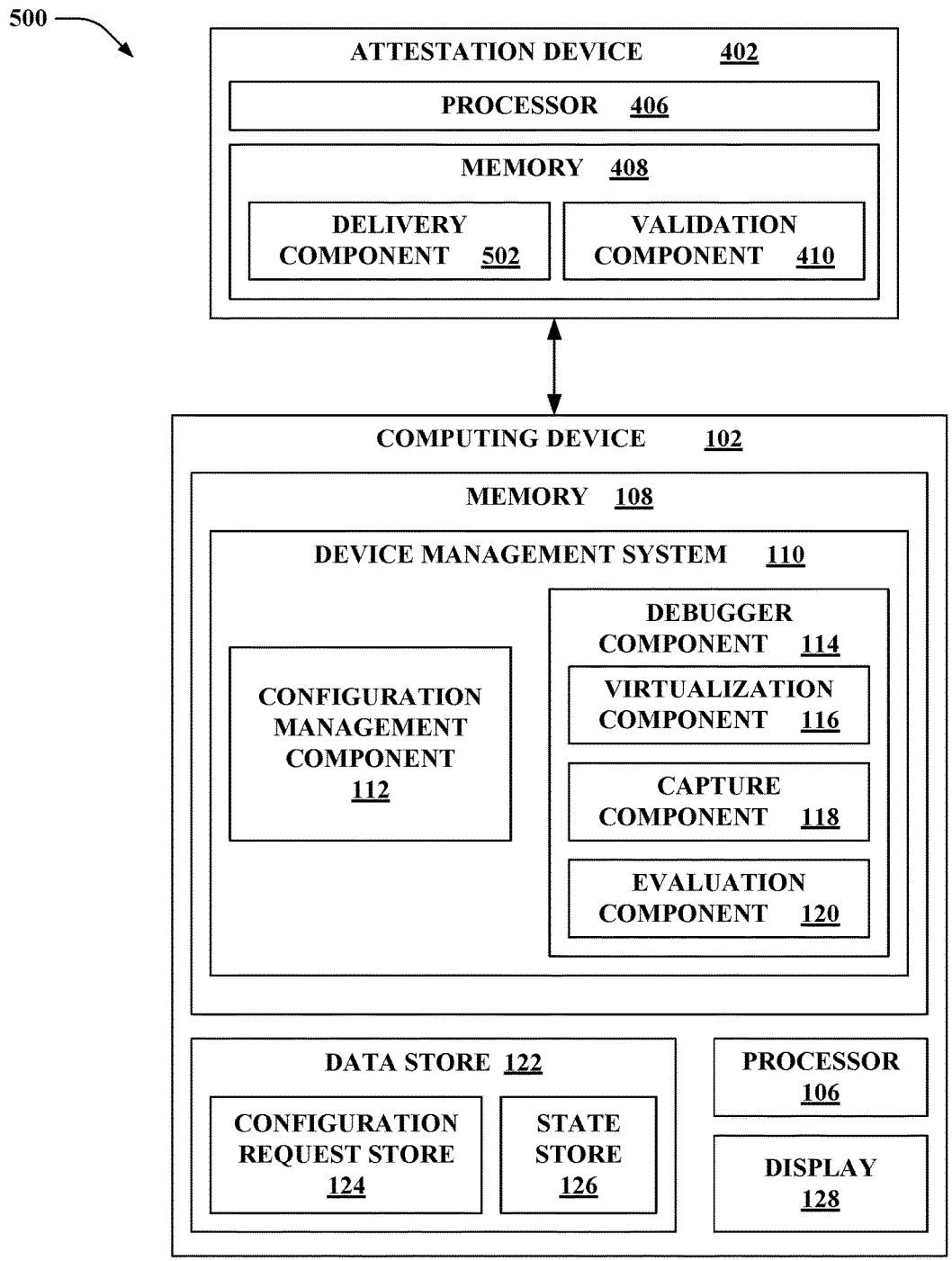
FIG. 5 illustrates a functional block diagram of another exemplary system that includes the attestation device physically coupled with the computing device.

With reference to FIG. 5, illustrated is yet another exemplary system 500 that includes the attestation device 402 physically coupled with the computing device 102. In the example set forth in FIG. 5, the memory 408 of the attestation device 402 can include the validation component 410 as well as a delivery component 502. The delivery component 502 can transmit a set of configuration requests for a configuration source (not shown) being tested on the computing device 102. Thus, rather than the configuration source sending the set of configuration requests to the computing device 102, the delivery component 502 can transmit the configuration requests to the computing device 102. Accordingly, the set of configuration requests can be received by the computing device 102 from the attestation device 402 physically coupled with the computing device 102. Similar to above with respect to FIG. 4, the validation component 410 can verify whether the enforced configuration state of the computing device 102 complies with the intended configuration state. In the example of FIG. 5, the enforced configuration state is based on the configuration changes to the computing device 102 in the virtual machine resulting from applying the configuration requests received from the attestation device 402.

Reference is now generally made to FIGS. 4 and 5. The attestation device 402 can be a hardware module that includes the configuration requests (in the example of FIG. 5) and rules to evaluate whether the intent of the configurations applied in the virtual machine on the computing device 102 are met (e.g., implemented by the validation component 410). Because the computing device 102 is in the configuration compliance evaluation mode, the capture component 118 of the debugger component 114 can capture each interaction with the attestation device 402 setting the test configurations. Moreover, application of the configuration requests can be virtualized on the computing device 102 (e.g., the configuration requests can be applied by the configuration management component 112 in the virtual machine run by the virtualization component 116). According to an example, an administrator can use attestation from subsystem interaction component(s) (e.g., the subsystem interaction components 200-202) available from different subsystems to ensure that the subsystems are configured as intended. The attestation device 402 can run through the intent verification steps and generate a report which specifies details of whether the applied configurations are successful. When the computing device 102 finishes syncing with the attestation device 402, a report from the attestation device 402 can be outputted (e.g., enabling an administrator to review such report). After verifying that each configuration intent is being enforced correctly, the administrator can sign off on the set of configuration requests for the configuration source as being suitable to be distributed to a set of computing devices in an environment that are currently not configured by the configuration source (e.g., the set of computing devices may or may not be configured by one or more other configuration source(s)). Accordingly, the computing device 102 can discontinue operating in the configuration compliance evaluation mode and the virtualized settings can be removed, with the computing device 102 returning to its prior state. The configuration requests for the configuration source can further be distributed (e.g., from the configuration source) for implementation on the set of computing devices in the environment.

Figure 6:
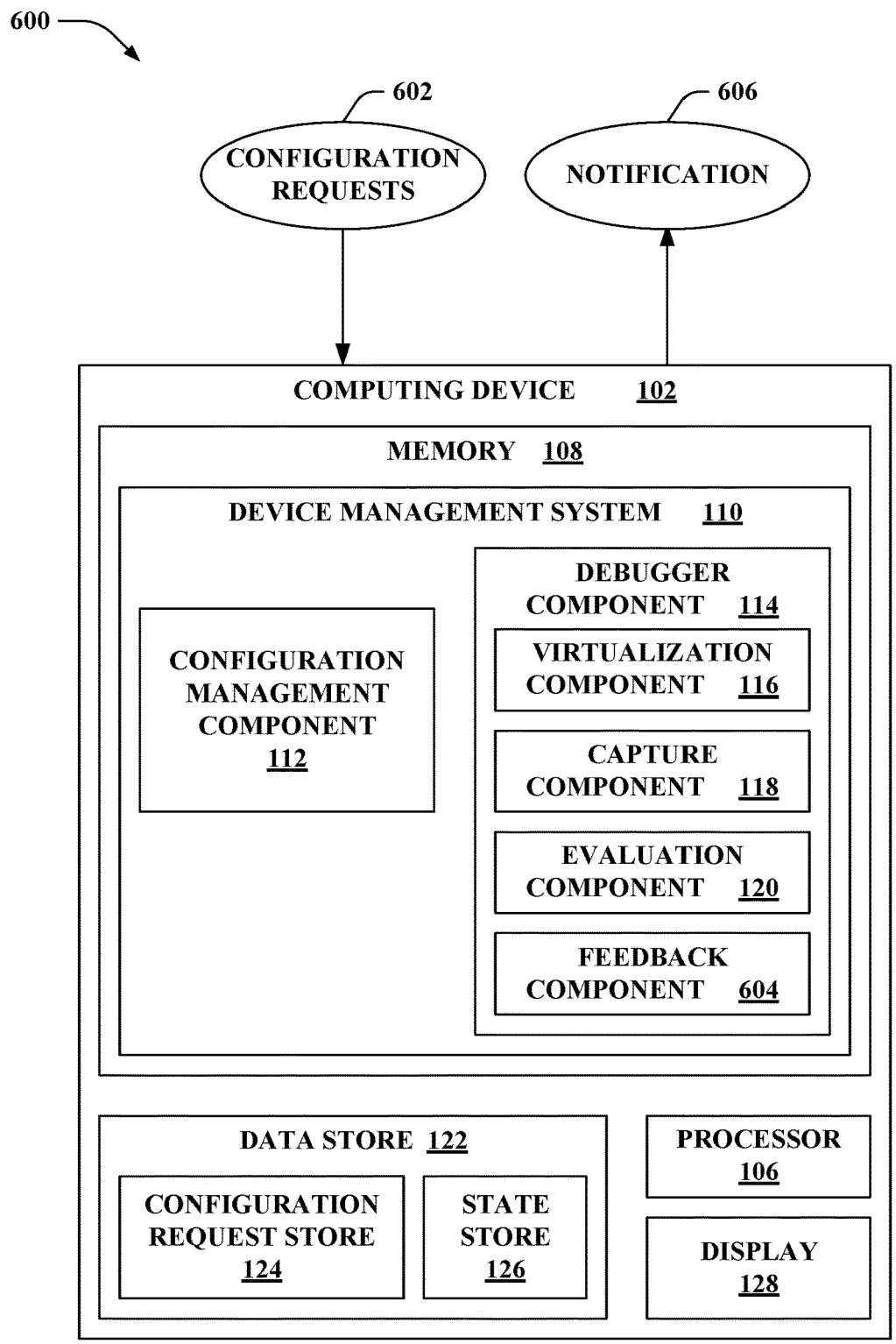
FIG. 6 illustrates a functional block diagram of another exemplary system that evaluates configuration compliance of the computing device.

Turning to FIG. 6, illustrated is another system 600 that evaluates configuration compliance of the computing device 102. The computing device 102 again includes the device management system 110, which further includes the configuration management component 112 and the debugger component 114. When operating in the configuration compliance evaluation mode, the computing device 102 can receive a set of configuration requests 602 for a configuration source. As described herein, the configuration requests 602 can be received from the configuration source or an attestation device physically coupled with the computing device 102.

The debugger component 114 can further include a feedback component 604 that can evaluate the configuration requests 602 as applied in the virtual machine and identify invalid, missing, unenforceable, etc. configuration request(s). Moreover, the feedback component 604 can transmit a notification 606 (e.g., to the configuration source, the attestation device, a differing computing device or server of an administrator, etc.) that indicates the invalid, missing, unenforceable, etc. configuration request(s). The notification 606 can specify suggestions (e.g., indicating incomplete payload sets, unenforceable configuration request(s), etc.), errors, or the like. The notification 606 can be used to notify an administrator, automatically update the configuration requests 602, and so forth.

In accordance with an example, the feedback component 604 can identify that a particular configuration request in the set of configuration requests 602 causes an invalid configuration (e.g., the enforced configuration state differs from the intended configuration state for the configuration). Following this example, the feedback component 604 can cause the computing device 102 to transmit a notification 606 (e.g., to the configuration source, the attestation device, the differing computing device or server) that indicates that the particular configuration request causes an invalid configuration.

According to a further example, the feedback component 604 can identify that a particular configuration request in the set of configuration requests 602 is unenforceable on the computing device 102. For instance, the particular configuration request can attempt to configure a feature that is irrelevant for the computing device 102. As an illustration, the particular configuration request may attempt to block a camera from turning on, however, the computing device 102 may lack a camera; accordingly, the configuration request can be meaningless for the computing device 102. Thus, the feedback component 604 can cause the computing device 102 to transmit a notification 604 (e.g., to the configuration source, the attestation device, the differing computing device or server)) that indicates that the particular configuration request is unenforceable. Such notification 606 can enable reducing a number of configuration requests in the set.

Pursuant to yet another example, the feedback component 604 can detect security misconfiguration (e.g., automatically, based on learning), and can send a notification 606 based upon the detected security misconfiguration. The notification can enable the misconfiguration to be corrected (e.g., automatically, by alerting an administrator, supplying a recommendation for a change in the set of configuration requests 606, etc.).

The feedback component 604, for instance, can identify policies and resources from a set and surface missing related sets to an administrator via the notification 606. Moreover, the feedback component 604 can identify and surface configuration sets that are incomplete or where the configuration will not result in the intended behavior. Accordingly, the feedback component 604 can analyze a current enforced configuration state (e.g., a full state, post process) of the computing device 102 rather than individual configuration payloads.

Figure 7:
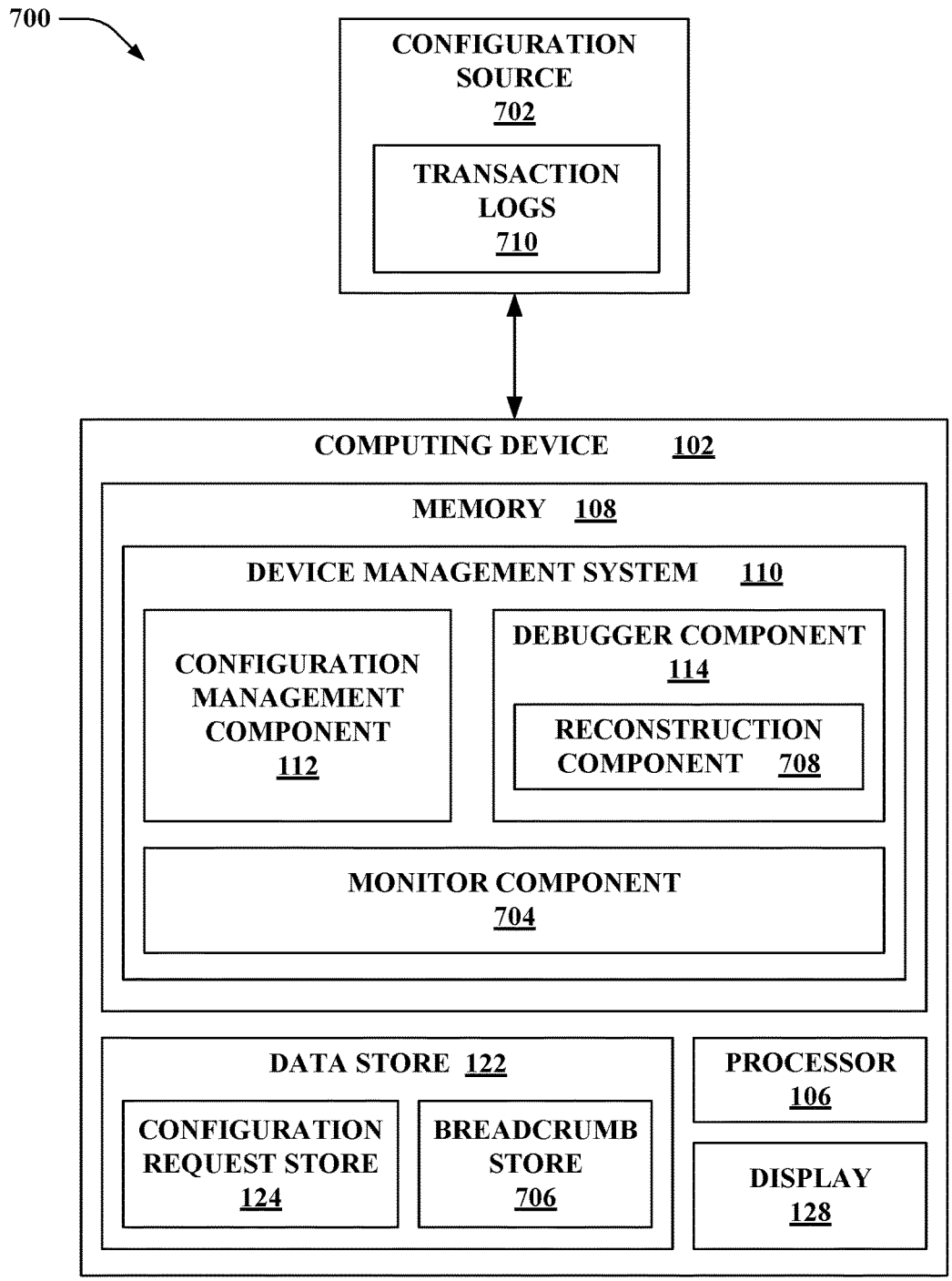
FIG. 7 illustrates a functional block diagram of an exemplary system that enables analyzing configuration compliance of the computing device after enrollment in a configuration source.

Now turning to FIG. 7, illustrated is a system 700 that enables analyzing configuration compliance of the computing device 102 after enrollment in a configuration source. Accordingly, in the system 700, the computing device 102 may be evaluated as part of a support scenario after configuration requests have been applied. In the support scenario described in FIG. 7, the computing device 102 is enrolled in the configuration source 702 (e.g., the debugger component 114 of the computing device 102 can operate without the temporary enrollment in the virtualized environment described above). In the system 700, a set of configuration requests from the configuration source 702 (e.g., the configuration source 104, the configuration sources 302-304, the configuration source(s) 404) are applied on the computing device 102 (e.g., by the configuration management component 112). While one configuration source 702 is shown in FIG. 7 (and described below), it is contemplated that the computing device 102 can be enrolled in substantially any number of configuration sources.

The computing device 102 can receive the set of configuration requests for the computing device 102 from the configuration source 702, and the configuration management component 112 can cause the configuration requests to be applied on the computing device 102. The configuration requests are not applied in the test environment in the example of FIG. 7; rather, the configuration requests are actually deployed on the computing device 102. The configuration requests can be received and applied after testing and acceptance of the configuration requests as described above; yet, the claimed subject matter is not so limited. Moreover, the configuration requests received from the configuration source 702 can be stored in the configuration request store 124 of the data store 122.

The device management system 110 can further include a monitor component 704 that can generate breadcrumbs as the configuration requests are applied on the computing device 102. The breadcrumbs can further be stored by the monitor component 704 in a breadcrumb store 706 of the data store 122. The breadcrumbs comprise data that provides a history of how the configuration requests are applied on the computing device 102. The breadcrumbs retained in the breadcrumb store 706 can be protected (e.g., hardware protected, encrypted, etc.).

According to an example, the computing device 102 may be misconfigured. For instance, a feature enabled by the configuration requests can stop working on the computing device 102. Thus, the debugger component 114 can be initiated (e.g., automatically, by a user) to enable the misconfiguration to be identified. The debugger component 114 can include a reconstruction component 708 that can reconstruct a history of the configuration requests being applied on the computing device 102 based on the breadcrumbs retained in the breadcrumb store 706, the configuration requests retained in the configuration request store 124, and a current enforced configuration state of the computing device 102. According to an example, the reconstruction component 708 can further reconstruct the history of the configuration requests being applied on the computing device 102 based on data from server-side transaction logs 710 of the configuration source 702. The history of the configuration requests being applied on the computing device 102 can be reconstructed subsequent to the configuration requests being applied on the computing device 102 (e.g., automatically, upon receipt of user input). Once reconstructed, the debugger component 114 enables traversing through the history of the configuration requests being applied on the computing device 102 as reconstructed to identify a source of the misconfiguration (e.g., determine which configuration request caused the misconfiguration, determine which configuration merge caused the misconfiguration). For instance, data for verifying enforcement of configuration changes over a time period during which the set of configuration requests are applied can be obtained from the reconstructed history and displayed by the debugger component 114 (e.g., by the evaluation component 120) on the display 128.

When stepping through the reconstructed history, a configuration request (or plurality of configuration requests) can be identified as a source of the misconfiguration. Accordingly, updated configuration request(s) can be provided to the computing device 102 to fix the misconfiguration. Thus, the updated configuration request(s) can be made part of the set of configuration requests provided by the configuration source 702 for deployment on other computing devices.

Pursuant to an example, reconstruction performed by the reconstruction component 708 can be automatically triggered by the computing device 102. For instance, if the debugger component 114 identifies that breadcrumbs are not being generated by the monitor component 704 during application of the configuration requests, then reconstruction can be triggered. Reconstruction can also be triggered based on errors detected by the debugger component 114.

According to another example, if the debugger component 114 identifies that the computing device 102 is not compliant with an intended configuration state, then the debugger component 114 can trigger unenrolling the computing device 102, locking the computing device 102, or placing the computing device 102 in a suspend mode. It is also contemplated that operation parameters can be changed on the device if the debugger component 114 detects that the computing device 102 is not compliant.

Pursuant to another illustration, when the computing device 102 is identified as being misconfigured, it is contemplated that reconstruction can be performed by a computing device other than the computing device 102 (e.g., a helpdesk computing device can perform the reconstruction of the application of the configuration requests).

Figure 8:
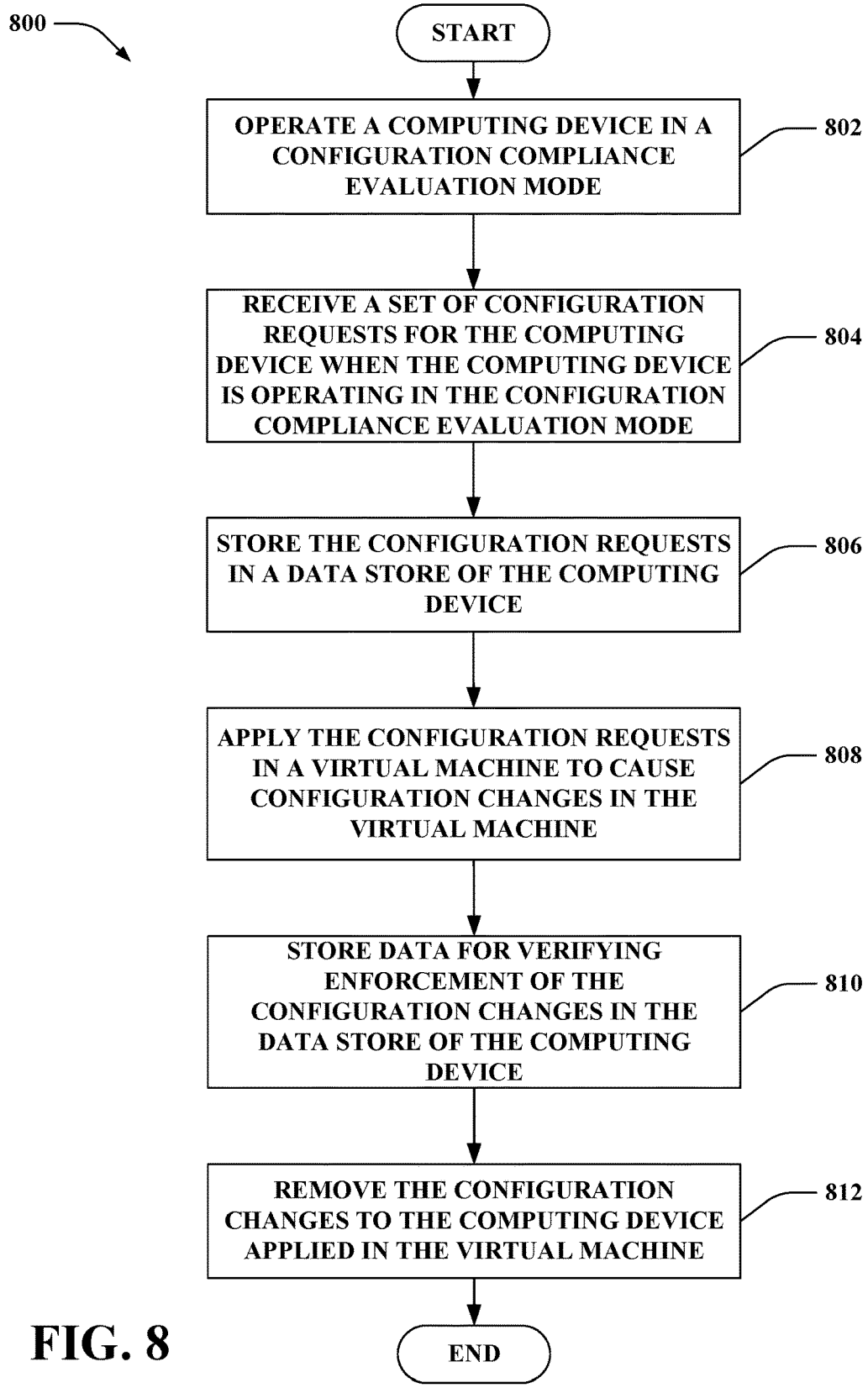
FIG. 8 is a flow diagram that illustrates an exemplary methodology of evaluating configuration compliance of a computing device.
Figure 9:
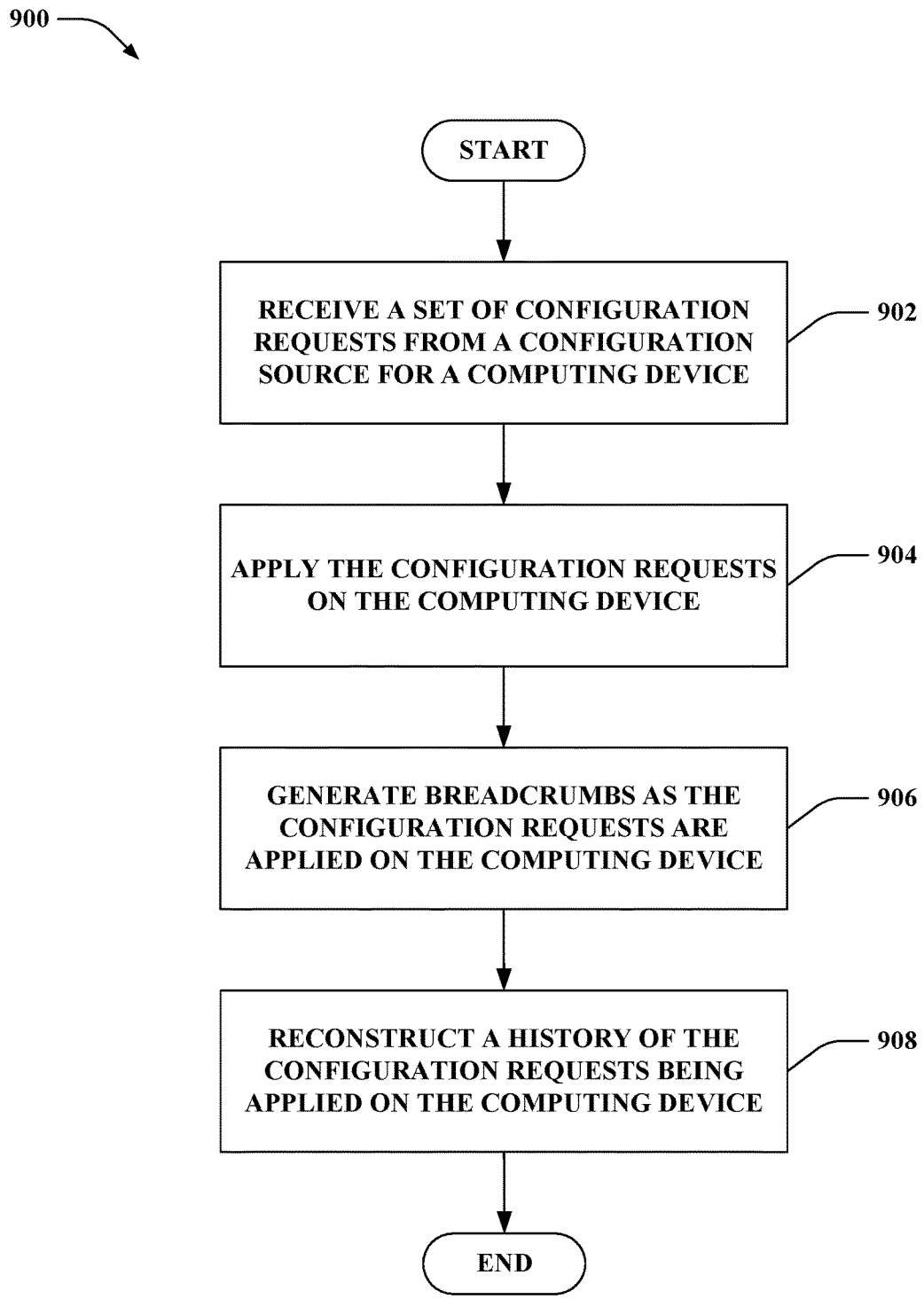
FIG. 9 is a flow diagram that illustrates an exemplary methodology of analyzing configuration compliance of a computing device after enrollment in a configuration source.

FIGS. 8-9 illustrate exemplary methodologies relating evaluating configuration compliance of a computing device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 8 illustrates a methodology 800 of evaluating configuration compliance of a computing device. At 802, the computing device can be operated in a configuration compliance evaluation mode. Configuration changes to the computing device are applied in a virtual machine run on the computing device when operating in the configuration compliance evaluation mode. At 804, a set of configuration requests for the computing device can be received at the computing device. The set of configuration requests can be received when the computing device is operating in the configuration compliance evaluation mode. At 806, the configuration requests can be stored in a data store of the computing device in response to the configuration requests being received when the computing device is operating in the configuration compliance evaluation mode. Moreover, responsive to the configuration requests in the set being received and when the computing device is operating in the configuration compliance evaluation mode, the configuration requests can be applied in the virtual machine to cause a configuration change in the virtual machine at 808 and data for verifying enforcement of the configuration changes can be stored in the data store of the computing device at 810. At 812, the configuration changes to the computing device applied in the virtual machine can be removed when the computing device discontinues operating in the configuration compliance evaluation mode.

Turning to FIG. 9, illustrated is a methodology 900 of analyzing configuration compliance of a computing device after enrollment in a configuration source. At 902, a set of configuration requests for the computing device can be received, at the computing device, from the configuration source. At 904, the configuration requests can be applied on the computing device. At 906, breadcrumbs can be generated as the configuration requests are applied on the computing device. At 908, a history of the configuration requests applied on the computing device can be reconstructed based on the breadcrumbs, the configuration requests, and a current enforced configuration state of the computing device. Accordingly, the history of the configuration requests being applied on the computing device as reconstructed can be traversed through (e.g., responsive to user input received by the computing device, to identify a source of misconfiguration of the computing device).

Figure 10:
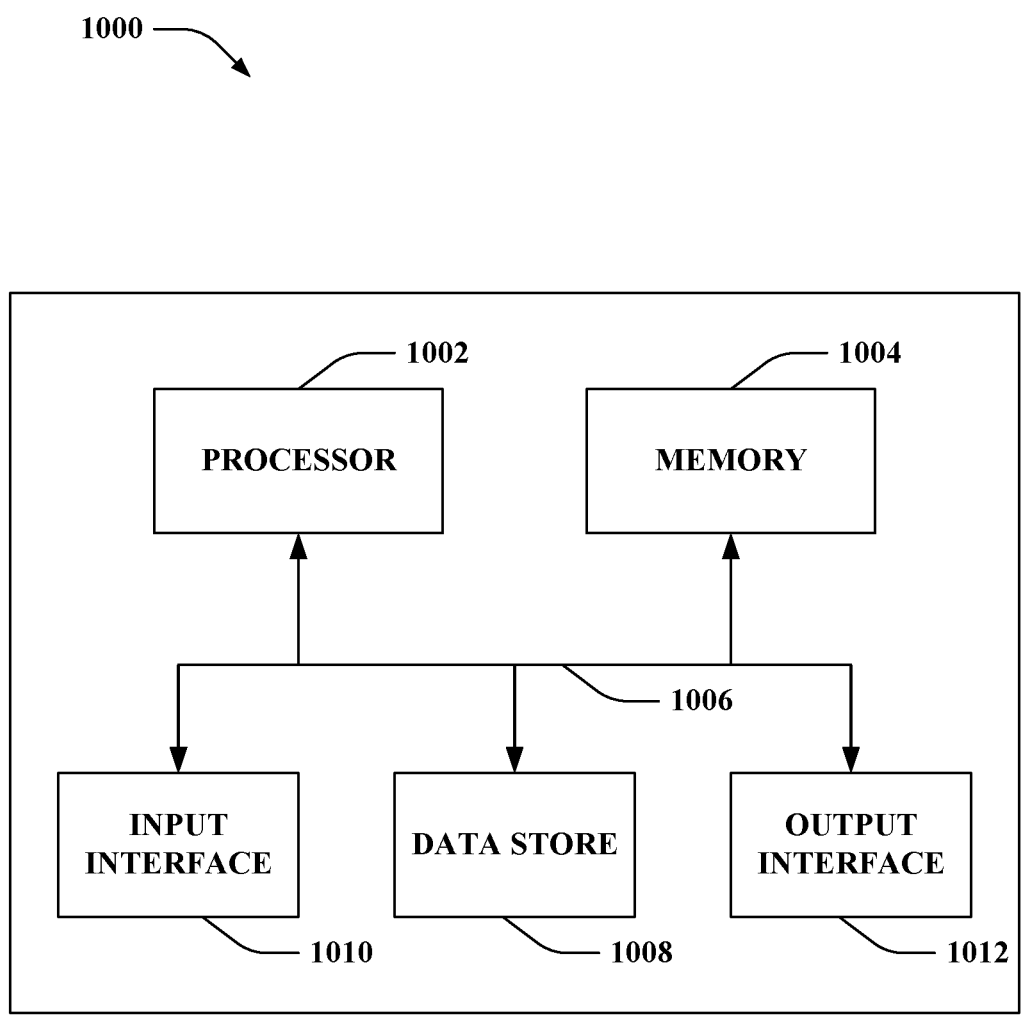
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be the computing device 102. By way of another example, the computing device 1000 may be the attestation device 402. Pursuant to yet another example, a configuration source may include the computing device 1000. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store configuration requests, data for verifying enforcement of configuration changes, breadcrumbs, and so forth.

The computing device 1000 additionally includes a data store 1008 that is accessible by the processor 1002 by way of the system bus 1006. The data store 1008 may include executable instructions, configuration requests, data for verifying enforcement of configuration changes, breadcrumbs, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various examples are now set forth.

EXAMPLE 1

A method of evaluating configuration compliance of a computing device, comprising: operating the computing device in a configuration compliance evaluation mode, wherein configuration changes to the computing device are applied in a virtual machine run on the computing device when operating in the configuration compliance evaluation mode; receiving, at the computing device, a set of configuration requests for the computing device when the computing device is operating in the configuration compliance evaluation mode; responsive to each configuration request in the set being received and when the computing device is operating in the configuration compliance evaluation mode: storing the configuration request in a data store of the computing device; applying the configuration request in the virtual machine to cause a configuration change in the virtual machine; and storing data for verifying enforcement of the configuration change in the data store of the computing device; and removing the configuration changes to the computing device applied in the virtual machine when the computing device discontinues operating in the configuration compliance evaluation mode.

EXAMPLE 2

The method according to Example 1, wherein the computing device is not previously enrolled in a configuration source prior to operating in the configuration compliance evaluation mode and receiving the set of configuration requests.

EXAMPLE 3

The method according to Example 1, wherein the computing device is previously enrolled in at least one configuration source prior to operating in the configuration compliance evaluation mode and receiving the set of configuration requests, and wherein applying at least one of the configuration requests in the set in the virtual machine comprises merging the at least one of the configuration requests in the set with a conflicting configuration request from the at least one configuration source in which the computing device is previously enrolled.

EXAMPLE 4

The method according to any of Examples 1-3, wherein the set of configuration requests are part of an enrollment in a configuration source.

EXAMPLE 5

The method according to any of Examples 1-4, wherein the set of configuration requests are received from a configuration source.

EXAMPLE 6

The method according to any of Examples 1-4, wherein the set of configuration requests are received from an attestation device physically coupled with the computing device.

EXAMPLE 7

The method according to any of Examples 1-6, further comprising: verifying whether an enforced configuration state of the computing device complies with an intended configuration state, wherein the enforced configuration state is based on the configuration changes to the computing device.

EXAMPLE 8

The method according to Example 7, wherein the verifying of whether the enforced configuration state of the computing device complies with the intended configuration state is performed by an attestation device physically coupled with the computing device.

EXAMPLE 9

The method according to Example 7, further comprising: displaying, on a display of the computing device, a user interface that includes instructions for verifying whether the enforced configuration state of the computing device complies with the intended configuration state.

EXAMPLE 10

The method according to any of Examples 1-9, further comprising: undoing at least one of the configuration changes to the computing device applied in the virtual machine based on at least one of the configuration requests in the set when the computing device is operating in the configuration compliance evaluation mode.

EXAMPLE 11

The method according to Example 10, further comprising: subsequent to undoing the at least one of the configuration changes, receiving, at the computing device, an updated configuration request for the computing device when the computing device is operating in the configuration compliance evaluation mode; responsive to the updated configuration request being received and when the computing device is operating in the configuration compliance evaluation mode: storing the updated configuration request in the data store of the computing device; applying the updated configuration request in the virtual machine to cause an updated configuration change in the virtual machine; and storing data for verifying enforcement of the updated configuration change in the data store of the computing device; and verifying whether an updated, enforced configuration state of the computing device complies with an intended configuration state, wherein the updated, enforced configuration state is based at least in part on the updated configuration change to the computing device.

EXAMPLE 12

The method according to any of Examples 1-11, further comprising: displaying the data for verifying enforcement of the configuration changes over a time period during which the set of configuration requests are applied.

EXAMPLE 13

The method according to any of Examples 1-12, further comprising: identifying that a particular configuration request in the set of configuration requests is unenforceable on the computing device; and transmitting, from the computing device, a notification that indicates that the particular configuration request is unenforceable.

EXAMPLE 14

A computing device, comprising: a data store; at least one processor; and memory that comprises computer-executable instructions that, when executed by the at least one processor, cause the at least one processor to perform acts including: operating the computing device in a configuration compliance evaluation mode, wherein configuration changes to the computing device are applied in a virtual machine run on the computing device when operating in the configuration compliance evaluation mode; receiving a set of configuration requests for the computing device when the computing device is operating in the configuration compliance evaluation mode; responsive to each configuration request in the set being received and when the computing device is operating in the configuration compliance evaluation mode: storing the configuration request in the data store of the computing device; applying the configuration request in the virtual machine to cause a configuration change in the virtual machine; and storing data for verifying enforcement of the configuration change in the data store of the computing device; and removing the configuration changes to the computing device applied in the virtual machine when the computing device discontinues operating in the configuration compliance evaluation mode.

EXAMPLE 15

The computing device according to Example 14, wherein the computing device is physically coupled with an attestation device, wherein the attestation device is configured to verify whether an enforced configuration state of the computing device complies with an intended configuration state, and wherein the enforced configuration state is based on the configuration changes to the computing device.

EXAMPLE 16

The computing device according to any of Examples 14-15, wherein the computing device is not previously enrolled in any configuration source prior to operating in the configuration compliance evaluation mode and receiving the set of configuration requests, and wherein the set of configuration requests are part of an enrollment in a configuration source.

EXAMPLE 17

The computing device according to any of Examples 14-15, wherein the computing device is previously enrolled in at least one configuration source prior to operating in the configuration compliance evaluation mode and receiving the set of configuration requests, and wherein the set of configuration requests are part of a differing enrollment in a configuration source.

EXAMPLE 18

A method of analyzing configuration compliance of a computing device after enrollment in a configuration source, comprising: receiving, at the computing device, a set of configuration requests from the configuration source for the computing device; applying the configuration requests on the computing device; generating breadcrumbs as the configuration requests are applied on the computing device; and reconstructing a history of the configuration requests being applied on the computing device based on the breadcrumbs, the configuration requests, and a current enforced configuration state of the computing device.

EXAMPLE 19

The method according to Example 18, further comprising: automatically triggering the reconstructing of the history of the configuration requests being applied on the computing device.

EXAMPLE 20

The method according to any of Examples 18-19, further comprising: traversing through the history of the configuration requests being applied on the computing device as reconstructed.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of evaluating configuration compliance of a computing device, comprising:
   operating the computing device in a configuration compliance evaluation mode, wherein configuration changes to the computing device are applied in a virtual machine run on the computing device when operating in the configuration compliance evaluation mode, wherein the computing device is previously enrolled in a configuration source prior to operating in the configuration compliance evaluation mode;
   receiving, at the computing device, a set of configuration requests for the computing device when the computing device is operating in the configuration compliance evaluation mode;
   responsive to each of the configuration requests in the set of configuration requests being received and when the computing device is operating in the configuration compliance evaluation mode:
      storing a configuration request in a data store of the computing device;
      applying the configuration request in the virtual machine to cause a configuration change in the virtual machine, wherein applying at least one of the configuration requests in the set of configuration requests in the virtual machine comprises merging the at least one of the configuration requests in the set of configuration requests with a conflicting configuration request from the configuration source in which the computing device is previously enrolled; and
      storing data for verifying enforcement of the configuration change in the data store of the computing device; and
   removing the configuration changes to the computing device applied in the virtual machine when the computing device discontinues operating in the configuration compliance evaluation mode.

2. The method of claim 1, wherein the set of configuration requests are part of an enrollment in a differing configuration source.

3. The method of claim 1, wherein the set of configuration requests are received from a differing configuration source.

4. The method of claim 1, wherein the set of configuration requests are received from an attestation device physically coupled with the computing device.

5. The method of claim 1, further comprising:
verifying whether an enforced configuration state of the computing device complies with an intended configuration state, wherein the enforced configuration state is based on the configuration changes to the computing device.

6. The method of claim 5, wherein the verifying of whether the enforced configuration state of the computing device complies with the intended configuration state is performed by an attestation device physically coupled with the computing device.

7. The method of claim 5, further comprising:
displaying, on a display of the computing device, a user interface that includes instructions for verifying whether the enforced configuration state of the computing device complies with the intended configuration state.

8. The method of claim 1, further comprising:
undoing at least one of the configuration changes to the computing device applied in the virtual machine based on at least one of the configuration requests in the set of configuration requests when the computing device is operating in the configuration compliance evaluation mode.

9. The method of claim 8, further comprising:
subsequent to undoing the at least one of the configuration changes, receiving, at the computing device, an updated configuration request for the computing device when the computing device is operating in the configuration compliance evaluation mode;
responsive to the updated configuration request being received and when the computing device is operating in the configuration compliance evaluation mode:
storing the updated configuration request in the data store of the computing device;
applying the updated configuration request in the virtual machine to cause an updated configuration change in the virtual machine; and
storing data for verifying enforcement of the updated configuration change in the data store of the computing device; and
verifying whether an updated, enforced configuration state of the computing device complies with an intended configuration state, wherein the updated, enforced configuration state is based at least in part on the updated configuration change to the computing device.

10. The method of claim 1, further comprising:
displaying the data for verifying enforcement of the configuration changes over a time period during which the set of configuration requests are applied.

11. The method of claim 1, further comprising:
identifying that a particular configuration request in the set of configuration requests is unenforceable on the computing device; and
transmitting, from the computing device, a notification that indicates that the particular configuration request is unenforceable.

12. A computing device, comprising:
a data store;
at least one processor; and
memory that comprises computer-executable instructions that, when executed by the at least one processor, cause the at least one processor to perform acts including:
operating the computing device in a configuration compliance evaluation mode, wherein configuration changes to the computing device are applied in a virtual machine run on the computing device when operating in the configuration compliance evaluation mode, wherein the computing device is previously enrolled in a configuration source prior to operating in the configuration compliance evaluation mode;
receiving a set of configuration requests for the computing device when the computing device is operating in the configuration compliance evaluation mode;
responsive to each of the configuration requests in the set of configuration requests being received and when the computing device is operating in the configuration compliance evaluation mode:
storing a configuration request in the data store of the computing device;
applying the configuration request in the virtual machine to cause a configuration change in the virtual machine, wherein applying at least one of the configuration requests in the set of configuration requests in the virtual machine comprises merging the at least one of the configuration requests in the set of configuration requests with a conflicting configuration requests from the configuration source in which the computing device is previously enrolled; and
storing data for verifying enforcement of the configuration change in the data store of the computing device; and
removing the configuration changes to the computing device applied in the virtual machine when the computing device discontinues operating in the configuration compliance evaluation mode.

13. The computing device of claim 12, wherein the computing device is physically coupled with an attestation device, wherein the attestation device is configured to verify whether an enforced configuration state of the computing device complies with an intended configuration state, and wherein the enforced configuration state is based on the configuration changes to the computing device.

14. The computing device of claim 12, wherein the set of configuration requests are part of a differing enrollment in a differing configuration source.

15. A method of analyzing configuration compliance of a computing device after enrollment in a configuration source, comprising:
receiving, at the computing device, configuration requests from the configuration source for the computing device;
applying the configuration requests on the computing device;
generating breadcrumbs as the configuration requests are applied on the computing device, wherein the breadcrumbs provide a history of how the configuration requests are applied to the computing device; and
reconstructing a history of the configuration requests being applied on the computing device based on the breadcrumbs, the configuration requests, and a current enforced configuration state of the computing device.

16. The method of claim 15, further comprising:
automatically triggering the reconstructing of the history of the configuration requests being applied on the computing device.

17. The method of claim 15, further comprising:
traversing through the history of the configuration requests being applied on the computing device as reconstructed.

18. The method of claim 15, wherein the computing device is operating in configuration compliance evaluation mode, wherein configuration changes brought about by the configuration requests are applied to the computing device in a virtual machine run on the computing device when operating in the configuration compliance evaluation mode.

19. The method of claim 18, wherein applying a configuration request in the configuration requests in the virtual machine comprises merging the configuration request with a conflicting configuration request from the configuration source.

20. The method of claim 19, wherein the breadcrumbs indicate that the configuration request was merged with the conflict configuration request.

\* \* \* \* \*